United States Patent [19]

Atherton et al.

[11] Patent Number: 4,884,161

[45] Date of Patent: Nov. 28, 1989

[54] INTEGRATED CIRCUIT VOLTAGE REGULATOR WITH TRANSIENT PROTECTION

[75] Inventors: James H. Atherton; Silvo Stanojevic, both of Freeport, Ill.

[73] Assignee: Honeywell, Inc., Minneapolis, Minn.

[21] Appl. No.: 839,453

[22] Filed: Mar. 10, 1986

Related U.S. Application Data

[63] Continuation of Ser. No. 498,343, May 26, 1983, abandoned.

[51] Int. Cl.[4] .......................... H02H 9/02; H02H 3/20

[52] U.S. Cl. .......................................... 361/18; 361/91; 361/111; 323/276; 323/313

[58] Field of Search ........................ 361/18, 88, 90, 91, 361/111; 323/266, 268, 270, 276, 313

[56] References Cited

U.S. PATENT DOCUMENTS

| | | | |
|---|---|---|---|
| 2,915,693 | 12/1959 | Harrison | 323/270 |
| 3,237,087 | 2/1966 | Greenberg | 323/270 X |
| 3,376,478 | 4/1968 | Sheng et al. | 323/276 X |
| 3,428,820 | 2/1969 | Lyon . | |
| 3,697,861 | 10/1972 | Frazier | 361/91 |
| 3,886,410 | 5/1975 | Seer, Jr. | 323/276 |
| 4,008,418 | 2/1977 | Murphy | 323/276 X |
| 4,021,701 | 5/1977 | Davies | 361/18 |
| 4,029,974 | 6/1977 | Brokaw . | |
| 4,161,760 | 7/1979 | Valentine | 361/18 |
| 4,240,024 | 12/1980 | Blackburn | 323/4 |
| 4,280,090 | 7/1981 | Lindberg | 323/315 |
| 4,282,477 | 8/1981 | Ahmed | 323/312 |
| 4,287,467 | 9/1981 | Gloaguen | 323/314 |
| 4,292,583 | 9/1981 | Hoeft | 323/316 |
| 4,319,179 | 3/1982 | Jett, Jr. | 323/281 |
| 4,405,964 | 9/1983 | Woods et al. | 361/18 |
| 4,412,265 | 10/1983 | Buuck | 361/18 |

OTHER PUBLICATIONS

M. Rehman, "Integrated Circuit Voltage Reference", *Electronic Engineering,* vol. 52, No. 638, pp. 65-85 (May 1970).

D. Ulrich, "Stabilisiertes Labor-Netzgerat fur groBen Ausgangsspannungsbereich", *Funkschau,* vol. 42, No. 2, pp. 51-52 (Jan. 2, 1970).

L. Cornish, "Transient-Testing Vital to Airborne Systems Reliability", *Electronic Engineering,* vol. 44, No. 535, pp. 61-63 (Sep. 1972).

K. Fukahori, et al. "A High Precision Micropower Operational Amplifier", *IEEE Journal of Solid-State Circuits,* vol. SC-14, No. 6, pp. 1048-1049 (Dec. 1979).

*Primary Examiner*—Todd E. Deboer
*Attorney, Agent, or Firm*—Charles L. Rubow

[57] ABSTRACT

A monolithic integrated circuit voltage regulator is disclosed in which a bipolar series pass transistor has both its collector and base electrodes protected from excessive positive and negative supply transients. Protection from positive voltage transients is provided by a reverse biased diode. Protection against negative voltage transients is provided by a bipolar transistor of opposite conductivity type from the pass transistor and a resistor in series therewith. The resistor is a diffused resistor comprising P-type material in an electrically isolated N-type well, resulting in blockage of negative voltage transients by both the transistor and the resistor.

27 Claims, 1 Drawing Sheet

INTEGRATED CIRCUIT VOLTAGE REGULATOR WITH TRANSIENT PROTECTION

This application is a continuation of application Ser. No. 498,343, filed May 26, 1983 now abandoned.

BACKGROUND OF THE INVENTION

The invention disclosed herein relates generally to voltage regulation circuitry, and more particularly to an integrated circuit voltage regulator capable of withstanding high transient voltage excursions such as found in automotive applications.

Electronic systems often include voltage regulators which receive electric current at an unregulated supply voltage and provide a regulated voltage to an electrical load. In modern systems, many of the load circuits requiring electrical power are integrated circuits. Integrated circuits and sensors used in connection therewith require relatively low voltages, typically six volts or less. It has become common in connection with such circuits and sensors to provide voltage regulation by means of integrated circuit voltage regulators either on a separate chip or on the same chip as the integrated circuit being powered.

Monolithic integrated circuits are being used increasingly in automotive applications. The automotive environment provides particularly severe voltage regulation requirements. Voltage transients of 80 or 90 volts of either polarity relative to ground may be present on the power supply conductors as a result of interaction of the alternator and main voltage regulator when the engine is shut down or jump started or a battery cable is lifted or certain other electrical connections are broken. In addition, automotive applications may require operation over a broad range of temperatures.

Thus, a voltage regulator for many automotive electronic circuits must provide a relatively closely regulated low voltage from a supply voltage subject to positive and negative voltage excursions many times the magnitude of the required voltage. Further, it must provide such regulation over a wide temperature range. Finally, cost and reliability are very important in automotive applications. Cost must be minimized, thus requiring a simple reliable circuit design which can be readily manufactured.

A problem encountered with circuits including bipolar transistors is that it is difficult to fabricate such transistors capable of withstanding voltage transients of the magnitude expected in automotive applications by common processes for fabricating monolithic integrated circuits. Accordingly, automotive integrated circuit voltage regulators must include some form of transient voltage protection. Various circuit designs and techniques for providing transient voltage protection are known.

One approach is shown in U.S. Pat. No. 4,319,179 issued to W. Jett, Jr. on March 9, 1982. This approach includes a high voltage sustaining transistor between a regulator pass device and an error amplifier which controls the pass device. High voltage sustaining capability is achieved by means of circuitry which reduces the impedance between the base of the transistor and ground in the event of a moderate transient voltage on the supply conductor. If a large transient voltage occurs, the base is essentially shorted to ground.

Although such circuitry increases the voltage sustaining capability of the transistor, the maximum permissible voltage is still limited to slightly less than the breakdown voltage of the transistor when connected with its base shorted to ground. This voltage limit may not be sufficiently high for many automotive applications. Application of a voltage higher than the breakdown voltage for any appreciable duration results in destruction of the transistor and failure of the regulator. Further, application of a voltage which causes the base electrode to be shorted to ground results in loss of voltage regulation. Even momentary loss of regulation can result in malfunction of logic circuits powered by the regulator. Finally, certain other transistors in the regulator are relatively unprotected, and, under certain conditions, may be subject to destructive voltages.

Many of the limitations of prior art voltage transient protection designs have been avoided in the applicants' voltage regulator which provides a substantially increased breakdown limit for the entire regulator and provides regulation up to the breakdown limit. Under transistor breakdown conditions current through the regulator is limited by internal impedances. Thus, exceeding the transistor breakdown voltage does not necessarily result in destruction of the regulator.

SUMMARY OF THE INVENTION

The present invention is an integrated circuit voltage regulator comprising a bipolar pass transistor of a first conductivity type which is protected against transient voltage excursions of both polarities by means of a bipolar preregulator transistor which supplies electrical current to the pass transistor and a reverse biased diode connecting the junction of the pass and preregulator transistors to a source of reference potential. First and second base drive means provide constant base drive signals to the pass and preregulator transistors whereby the preregulator transistor and its base drive means protects the pass transistor from transient voltages of a first polarity and the diode protects the pass transistor from transient voltages of a second polarity.

The preregulator transistor may have a resistor in series therewith for limiting the current through the transistor when it is in electrical breakdown due to an excessive voltage of the second polarity. The resistor may be a diffused resistor of a first conductivity type in an electrically isolated well of a second conductivity type so as to further block transient voltages of the first polarity. The base drive means for the pass transistor may comprise a zener diode and a current source which supplies sufficient current to maintain breakdown of the diode. Protection of the base of the pass transistor from excessive voltage excursions of the first polarity may be provided by means of a diffused resistor and a transistor in the same manner as protection is provided by the preregulator transistor and diffused resistor. The zener diode protects the base of the pass transistor from excessive voltage excursions of the second polarity.

DESCRIPTION OF THE PREFERRED EMBODIMENTS

Figure 1:
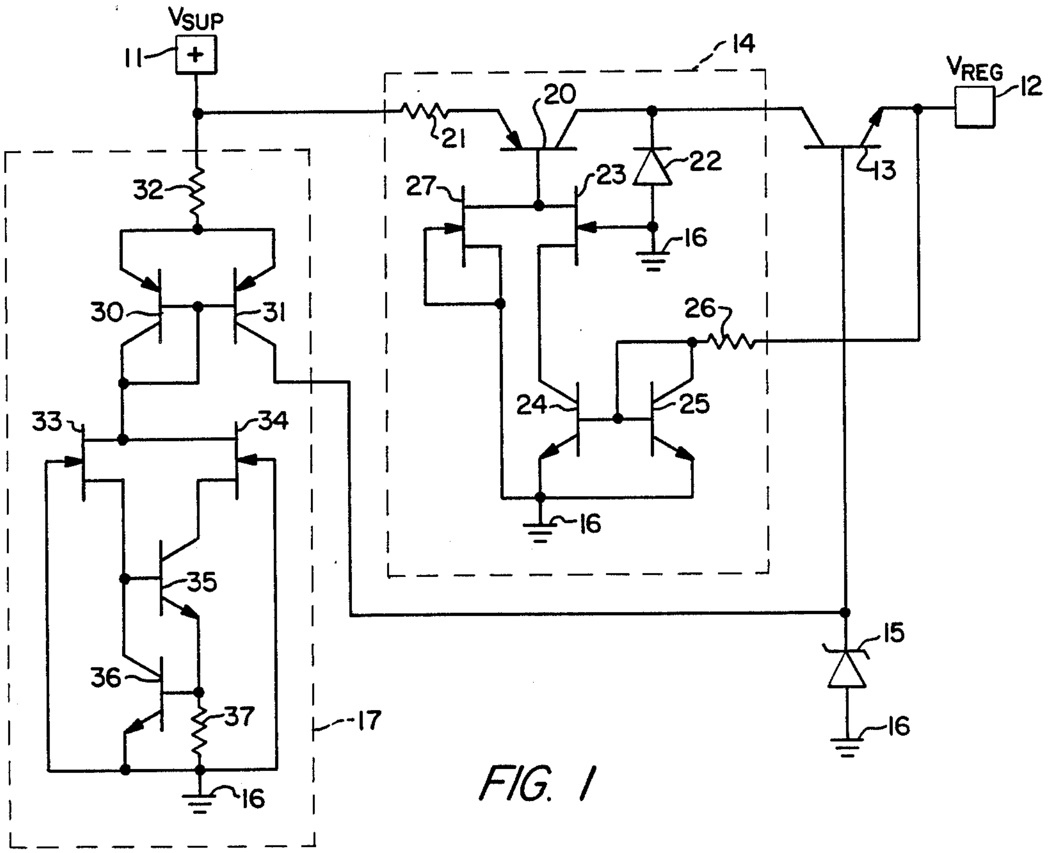
FIG. 1 is a schematic circuit diagram of a first embodiment of a voltage regulator in accordance with the applicants' invention.

In FIG. 1, an input terminal 11 is provided for receiving an unregulated voltage subject to substantial positive and negative voltage transients. This voltage is regulated and supplied as a constant voltage on an output terminal 12. The regulator circuit is designed to be advantageously fabricated as a monolithic integrated circuit using common epitaxial fabrication processes.

In the regulator circuit final regulation is accomplished by means of a regulator pass transistor 13 which is shown as an NPN transistor having its emitter connected to output terminal 12. Input terminal 11 is connected to the collector of transistor 13 through a preregulator circuit 14. A constant voltage base drive for transistor 13 is provided by a zener diode 15 having its cathode connected to the base of the transistor and its anode connected to ground or other reference potential source 16. Diode 15 is biased into breakdown by means of a bias circuit 17. As will be described in detail hereinafter, both preregulator circuit 14 and bias circuit 17 are designed to prevent excessive positive and negative voltage transients from reaching regulator pass transistor 13.

Preregulator circuit 14 comprises a PNP transistor 20 having its emitter connected to supply terminal 11 through a resistor 21 and its collector connected to the collector of regulator pass transistor 13. For purposes which will hereinafter be described, resistor 21 is preferably a diffused resistor of P-type material in an electrically isolated N-type well. The junction of the collectors of transistors 13 and 20 is connected to ground 16 through a diode 22 having its cathode connected to the collector junction and its anode connected to ground. The base of transistor 20 is connected to the drain electrode of a field effect transistor (FET) 23 whose gate electrode is connected to ground 16 and whose source electrode is connected to the collector of an NPN transistor 24. Transistor 24 is interconnected with an NPN transistor 25 to form a current mirror. Specifically, the bases of transistors 24 and 25 are connected together and the emitters of the transistors are connected to ground 16. The collector of transistor 25 is connected to the bases of the transistors, and to output terminal 12 through a resistor 26. A FET 27 has its drain connected to the base of transistor 20 and its source and gate connected to ground 16.

In actual implementation, preregulator circuit 14 was designed to limit the positive voltage at the collector of regulator pass transistor 13 to approximately 34 volts, thus protecting transistor 13 from excessive positive supply transients. This clamping action is provided by diode 22, with transistor 20 serving to limit the current when diode 22 breaks down. Transistor 20 and resistor 21 limit current when the supply voltage goes negative with respect to ground. Specifically, both transistor 20 and resistor 21 form reverse biased diodes when subjected to a negative supply voltage. Therefore, neither the transistor nor the resistor will normally conduct current under such voltage polarity conditions.

Base drive to transistor 20 is provided through resistor 26 and the current mirror comprising transistors 24 and 25. The emitter current in transistor 25 is determined by the regulated voltage at output terminal 12 and the resistance of resistor 26. Transistors 24 and 25 are formed with suitable parameters to cause this emitter current to be increased by a desired multiple (e.g., 5 times) in transistor 24. The collector current in transistor 24 is supplied to the base of transistor 20 through FET 23. FET 23 serves to limit the voltage to which the collector of transistor 24 is subjected so as to protect the transistor from the effect of large positive supply voltage transients. FET 27 insures sufficient base drive current for transistor 20 to initiate start-up of the regulator circuit.

Bias circuit 17 provides current adequate to maintain zener diode 15 in breakdown, while protecting the base of transistor 13 from excessive voltage transients. The bias circuit includes a current mirror comprising PNP transistors 30 and 31 whose emitters are connected to supply terminal 11 through a resistor 32. Transistors 30 and 31 and resistor 32 block negative supply transients in the same manner as transistor 20 and resistor 21. The collector of transistor 30 is connected to the drains of FETs 33 and 34 whose gates are connected to ground 16. The source electrode of FET 33 is connected to the base of an NPN transistor 35 and the collector of an NPN transistor 36. The source electrode of FET 34 is connected to the collector of transistor 35. The emitter of transistor 35 is connected directly to the base of transistor 36, and to ground 16 through a resistor 37. The emitter of transistor 36 is also connected to ground 16.

In operation, the collector current in transistor 30 is the sum of the currents through FETs 33 and 34. The emitter current of transistor 30 is multiplied by a predetermined factor (e.g., 4 times) in transistor 31 and supplied as the bias current for zener diode 15. The portion of the collector current in transistor 30 flowing through FET 33 enables start-up of transistor 35 which conducts the current applied to FET 34 to ground 16 through resistor 37. Transistor 36 limits the collector current of transistor 35 to the base-emitter voltage of transistor 36 divided by the resistance of resistor 37. The current through FET 33 is effectively limited by the characteristics of that device to the current which it conducts with its gate and source shorted. Thus, a fixed current is provided for biasing diode 15. FET 34 serves to protect transistor 35 from positive supply transients. With the current through transistor 30 closely regulated, the current supplied to the cathode of diode 15 is also closely regulated, and the voltage at the base of transistor 13 is protected from the effects of positive and negative supply transients.

Figure 2:
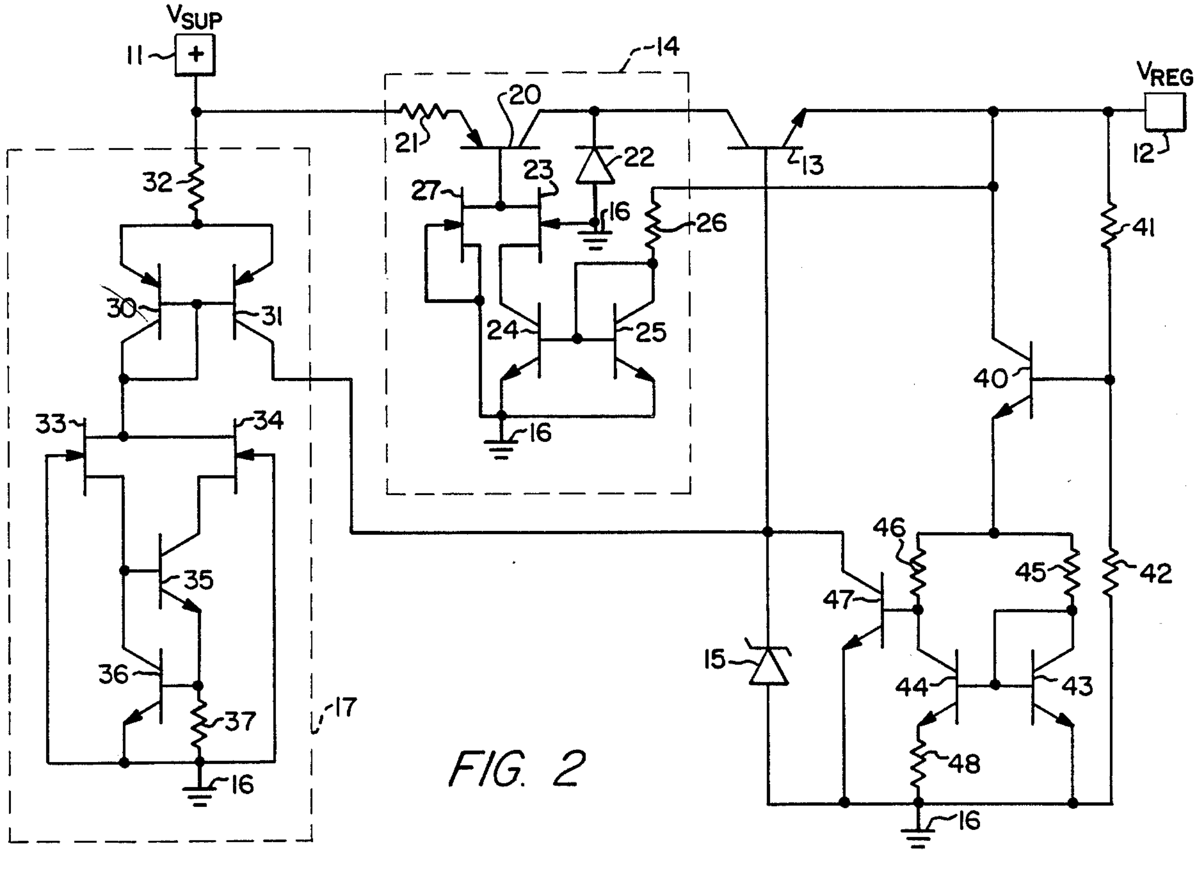
FIG. 2 is a schematic circuit diagram of a second embodiment of a voltage regulator in accordance with the applicants' invention.

In the previously described embodiment of FIG. 1, zener diode 15 provides a voltage reference for pass transistor 13. In one such typical embodiment, circuit component values were chosen to produce a regulated voltage of about 5.4 volts. In the circuit embodiment of FIG. 2, a bandgap reference is employed to produce a temperature stabilized regulated voltage of about 3.2 volts. Except for the voltage reference device or circuit, the circuits of FIGS. 1 and 2 are substantially identical. The same components in the circuits of the two figures are identified by the same reference numerals. Description of the embodiment of FIG. 2 will be limited to the bandgap voltage reference circuit.

The bandgap voltage reference circuit of FIG. 2 comprises an NPN transistor 40 whose collector is connected to output terminal 12 and whose base is supplied with a signal from a voltage divider comprising resistors 41 and 42 connected in series between output terminal 12 and ground 16. The emitter of transistor 40 is connected to the collectors of a pair of NPN transistors 43 and 44 through resistors 45 and 46 respectively. The resistances of resistors 45 and 46 may be unequal. The collector of transistor 43 is connected to the bases of transistors 43 and 44. The collector of transistor 44 is connected to the base of an NPN transistor 47 whose collector is connected to the base of pass transistor 13 and whose emitter is connected to ground 16. The emitter of transistor 43 is connected directly to ground 16 and the emitter of transistor 44 is connected directly to ground 16 through a resistor 48. Transistors 43 and 44 and resistor 48 together form a logarithmic current source.

In operation, the voltage at the base of transistor 13 is determined by the state of transistor 47 which is, in turn, controlled by transistor 40. The voltage at the base of transistor 40 is a temperature stabilized reference voltage comprising the sum of the base-emitter voltage drops of transistors 40 and 47 and the voltage drop across resistor 46. The current through resistor 46 is determined by the logarithmic current source. Therefore, the voltage across resistor 46 has a positive temperature coefficient which compensates for the negative temperature coefficients of the base-emitter junctions of transistors 40 and 47. The voltage divider comprising resistors 41 and 42 provides for adjusting the reference voltage.

In the circuit of FIG. 2, the bandgap reference provides for a lower regulated voltage than zener diode 15 in FIG. 1. Diode 15 in FIG. 2 functions to provide protection against any excessive positive voltage transients which are too fast for adequate response by the bandgap reference.

In accordance with the foregoing discussion, the applicants' integrated circuit voltage regulator is characterized by a substantially higher breakdown limit than prior art integrated circuit regulators. Regulation is not lost until the breakdown limit is exceeded. In the event of transistor breakdown, internal circuit impedances continue to limit current through the regulator so that it remains undamaged under all conditions likely to be encountered.

Although two embodiments of the present invention have been shown and described for illustrative purposes, various modifications within the applicants' contemplation and teaching will be apparent to those of ordinary skill in the relevant arts. It is not intended that coverage be limited to the embodiments shown, but only by the terms of the appended claims.

The embodiments of the invention in which an exclusive property or right is claimed are defined as follows:

1. An integrated circuit voltage regulator which is protected against excessive voltage excursions, comprising:

a supply terminal for receiving electrical current at a positive voltage which may have substantial superimposed excursions of positive or negative polarity relative to a reference voltage;

a source of the reference voltage;

an NPN regulator pass transistor having base, collector and emitter electrodes, said pass transistor being susceptible to electrical breakdown when positive or negative voltages in excess of first and second predetermined magnitudes respectively are impressed between the collector and base electrodes, the first and second predetermined magnitudes being less than the magnitudes of voltage excursions which may be present at said supply terminal;

first base drive means for supplying a substantially constant voltage to the base electrode of said pass transistor;

a diode having its anode connected to said source of the reference voltage and its cathode connected to the collector electrode of said pass transistor for limiting the positive voltage at the collector electrode to less than the first predetermined magnitude;

a first PNP transistor having base, collector and emitter electrodes, the collector electrode being connected to the collector electrode of said pass transistor;

first connecting means connecting said supply terminal to the emitter of said first PNP transistor; and second base drive means for supplying a substantially constant current to the base electrode of said first PNP transistor, whereby said first PNP transistor limits the negative voltage applied to the collector electrode of said pass transistor to less than the second predetermined magnitude and limits the current through said diode when it is in electrical breakdown.

2. The voltage regulator of claim 1 wherein said first connecting means comprises a first P-type diffused resistor in an electrically isolated N-type well.

3. The voltage regulator of claim 2 wherein said first base drive means comprises:

a Zener diode having its anode connected to said source of the reference voltage and its cathode connected to the base of said pass transistor; and current supply means for supplying sufficient current to the cathode of said Zener diode to maintain said Zener diode in electrical breakdown.

4. The voltage regulator of claim 3 wherein said current supply means comprises:

first and second NPN transistors each having base, collector and emitter electrodes, the collector electrode of said first NPN transistor being connected to the base electrode of said second NPN transistor and the emitter electrode of said second NPN transistor being connected to the base electrode of said first NPN transistor, the emitter electrode of said first NPN transistor being connected to said source of the reference voltage;

a resistor connecting the base electrode of said first NPN transistor and the emitter electrode of said second NPN transistor to said source of the reference voltage;

a first current mirror having first, second and third terminals, said first current mirror operating such that a current of a first magnitude at the second terminal results in a current of proportional magnitude at the third terminal;

second connecting means connecting said supply terminal to the first terminal of said first current mirror;

first and second field effect transistors each having gate, drain and source electrodes, the gate electrodes being connected to said source of the reference voltage, the drain electrodes being connected to the second terminal of said first current mirror, and the source electrodes of said first and second field effect transistors being connected to the collector electrodes of said first and second NPN transistors respectively; and third connecting means connecting the third terminal of said first current mirror to the cathode of said zener diode.

5. The voltage regulator of claim 4 wherein said second connecting means comprises a second P-type diffused resistor in an electrically isolated N-type well.

6. The voltage regulator of claim 5 wherein said second base drive means comprises:

a second current mirror having first, second and third terminals, said second current mirror operating such that a current of a predetermined magnitude at the second terminal results in a current of proportional magnitude at the third terminal, the first terminal of said second current mirror being connected to said source of the reference voltage;

a resistor connecting the emitter of said pass transistor to the second terminal of said second current mirror; and a third field effect transistor having gate, drain and source electrodes respectively connected to said source of the reference voltage, the base of said first PNP transistor and the third terminal of said second current mirror.

7. The voltage regulator of claim 6 including a fourth field effect transistor having gate, drain and source electrodes, the gate and source electrodes being connected to said source of the reference voltage and the drain electrode being connected to the base electrode of said first PNP transistor.

8. The voltage regulator of claim 1, 3 or 6 wherein said first base drive comprises:

a third NPN transistor having base, collector and emitter electrodes, the collector and emitter electrodes being connected to the base electrode of said pass transistor and said source of the reference voltage respectively;

a logarithmic current source having first, second and third and fourth terminals, said logarithmic current source operating such that a current of a first magnitude at the third terminal results in a current of uniquely related magnitude at the fourth terminal, the fourth terminal being connected to the base electrode of said third NPN transistor;

third connecting means connecting the first and second terminals of said logarithmic current source to said source of the reference voltage;

a fourth NPN transistor having base, collector and emitter electrodes, the collector electrode being connected to the emitter electrode of said pass transistor and the emitter electrode being connected to the third and fourth terminals of said logarithmic current source through a resistor circuit; and third base drive means for supplying a substantially constant voltage to the base electrode of said fourth NPN transistor.

9. The voltage regulator of claim 8 wherein said third base drive means comprises a resistive voltage divider connected between the emitter of said pass transistor and said source of the reference voltage.

10. The voltage regulator of claim 8 including a fourth field effect transistor having gate, drain and source electrodes, the gate and source electrodes being connected to said source of the reference voltage and the drain electrode being connected to the base electrode of said first PNP transistor.

11. An integrated circuit voltage regulator with improved protection against excessive voltage excursions, comprising:

a supply terminal for receiving electrical current at a voltage which may have substantial superimposed excursions of positive or negative polarity relative to a reference voltage;

a source of the reference voltage;

a bipolar regulator pass transistor of a first conductivity type having a base electrode and first and second additional electrodes, said pass transistor being susceptible to electrical breakdown when positive or negative voltages in excess of first and second predetermined magnitudes respectively are impressed between the base electrode and the first additional electrode, the first and second predetermined magnitudes being less than the magnitudes of the voltage excursions which may be present at said supply terminal;

first base drive means for supplying a substantially constant voltage to the base electrode of said pass transistor;

a diode connected between said source of the reference voltage and the first additional electrode of said pass transistor for limiting voltage excursions of the first polarity to less than the first predetermined magnitude;

a bipolar transistor of a second conductivity type having a base electrode and first and second additional electrodes, the first electrode being connected to the first electrode of said pass transistor;

connecting means connecting said supply terminal to the second terminal of said transistor of a second conductivity type; and second base drive means for supplying a substantially constant current to the base of said transistor of the second conductivity type.

12. An integrated circuit voltage regulator with improved transient protection, comprising:

an input terminal for receving elecrical current at a voltage which may have substantial superimposed excursions of first or second polarities relative to a reference voltage;

a source of the reference voltage:

an output terminal for supplying electrical current at a regulated voltage;

first and second bipolar transistors of opposite conductivity types, each having a base electrode and first and second additional electrodes;

first connecting means connecting said first and second transistors between said input and output terminals through their first an second additional electrodes so that corresponding additional electrodes of said first and second transistors are connected together at a junction and said first transistor is connected to said output terminal;

a diode connected between said source of the reference voltage and the junction of said first and second transistors for limiting voltage excursions of the first polarity at the junction to less than the electrical breakdown voltage of said first transistor; and first and second drive means for supplying substantially constant signals to the base electrodes of said first and second transistors respectively.

13. The voltage regulator of claim 12 wherein:

the regulated voltage supplied at said output terminal is positive with respect to the reference voltage;

said first and second transistors are NPN and PNP transistors respectively, each having collector, emitter and base electrodes;

said first connecting means connects said first and second transistors so that their collectors are connected at the junction and the emitter of said first transistor is connected to said output terminal; and said diode has its cathode connected to the collectors of said first and second transistors and its anode connected to said source of the reference voltage.

14. The voltage regulator of claim 13 wherein said first connecting means includes a first P-type diffused resistor in an electrically isolated N-type well connected between said input terminal and the emitter electrode of said second transistor.

15. The voltage regulator of claim 14 wherein said second drive means comprises:

a first current mirror having first, second and third terminals, said first current mirror operating such that a current of a predetermined magnitude at the second terminal results in a current of proportional magnitude at the third terminal, the first terminal of said first current mirror being connected to said source of the reference voltage;

second connecting means connecting said output terminal to the second terminal of said first current mirror;

a first field effect transistor having gate, drain and source electrodes connected through its drain and source electrodes between the base electrode of said second transistor and the third terminal of said first current mirror, the gate electrode being connected to said source of the reference voltage.

16. The voltage regulator of claim 15 wherein said first drive means includes a current source comprising:

third and fourth transistors, each being NPN transistors having base, collector and emitter electrodes, the collector electrode of said third transistor being connected to the base electrode of said fourth transistor and the emitter electrode of said fourth transistor being connected to the base electrode of said third transistor, the emitter electrode of said third transistor being connected to said source of the reference voltage;

a resistor connecting the base electrode of said third transistor and the emitter electrode of said fourth transistor to said source of the reference voltage;

a second current mirror having first, second and third terminals, said second current mirror operating such that a current of the first magnitude at the second terminal results in a current of proportional magnitude at the third terminal;

third connecting means connecting said input terminal to the first terminal of said second current mirror;

third and fourth field effect transistors each having gate, drain and source electrodes, the gate electrodes being connected to said source of the reference voltage, the drain electrodes being connected to the second terminal of said second current mirror, and the source electrodes of said second and third field effect transistors being connected to the collector electrodes of said third and fourth transistors respectively; and fourth connecting means connecting the third terminal of said second current mirror to the base electrode of said first transistor.

17. The voltage regulator of claim 16 wherein said third connecting means comprises a second P-type diffused resistor in an electrically isolated N-type well.

18. The voltage regulator of claim 17 wherein said first drive means includes a Zener diode having cathode and anode electrodes connected to the base of said first transistor and said source of the reference voltage respectively.

19. The voltage regulator of claim 18 wherein said first drive means further includes a voltage reference circuit comprising:

a fifth transistor of NPN conductivity type having base, collector and emitter electrodes, the collector and emitter electrodes being connected to the base electrode of said first transistor and said source of the reference voltage respectively;

a logarithmic current source having first, second, third and fourth terminals, said logarithmic current source operating such that a current of a first magnitude at the third terminal results in a current of uniquely related magnitude at the fourth terminal, the fourth terminal being connected to the base electrode of said fifth transistor;

fifth connecting means connecting the first and second terminals of said logarithmic current source to a source of the reference potential;

a sixth transistor of NPN conductivity type having base, collector and emitter electrodes, the collector electrode being connected to the emitter electrode of said first transistor and the emitter electrode being connected to the third and fourth terminals of said logarithmic current source through a resistor circuit; and third drive means for supplying a substantially constant voltage to the base electrode of said sixth transistor.

20. The voltage regulator of claim 17, 18 or 19 wherein said second drive means further includes a fourth field effect transistor having gate, drain and source electrodes, said fourth field effect transistor having its drain electrode connected to the base electrode of said second transistor and its source and gate electrodes connected to said source of the reference voltage.

21. The voltage regulator of claim 20 wherein said third drive means comprises a resistive voltage divider connected between said output terminal and said source of the reference voltage.

22. An integrated circuit voltage regulator which is protected against excessive voltage excursions, comprising:

a supply terminal for receiving electrical current at a positive voltage which may have substantial superimposed excursions of positive or negative polarity relative to a reference voltage;

a source of the reference voltage;

an NPN regulator pass transistor having base, collector and emitter electrodes, said pass transistor being susceptible to electrical breakdown when positive or negative voltage in excess of first and second predetermined magnitudes respectively are impressed between the collector and base electrodes, the first and second predetermined magnitudes being less than the magnitude of voltage excursions which may be present at said supply terminal;

first base drive means for supplying a substantially constant voltage to the base electrode of said pass transistor;

diode means having its anode connected to said source of the reference voltage and its cathode connected to the collector electrode of said pass transistor for limiting the positive voltage at the collector electrode to less than the first predetermined magnitude;

a PNP transistor having base, collector and emitter electrodes;

first connecting means connecting the collector electrodes of said first PNP transistor and said NPN regulator pass transistor;

second connecting means connecting said supply terminal to the emitter of said first PNP transistor; and second base drive means for supplying a substantially constant current to the base electrode of said PNP transistor, whereby said PNP transistor limits the negative voltage applied to the collector electrode of said pass transistor to less than the second predetermined magnitude and limits the current through said diode when it is in electrical breakdown.

23. The voltage regulator of claim 22 wherein said first base drive means comprises:

a Zener diode having its anode connected to said source of the reference voltage and its cathode connected to the base of said pass transistor; and current supply means for supplying sufficient current to the cathode of said Zener diode to maintain said Zener diode in electrical breakdown.

24. An integrated circuit voltage regulator with improved protection against excessive voltage excursions, comprising:

a supply terminal for receiving electrical current, at a voltage which may have substantial superimposed excursions of positive or negative polarity relative to a reference voltage;

a source of the reference voltage;

a bipolar regulator pass transistor of a first conductivity type having a base electrode and first and second additional electrodes, said pass transistor being susceptible to electrical breakdown when positive or negative voltages in excess of first and second predetermined magnitudes respectively are impressed between the base electrode and the first additional electrode, the first and second predetermined magnitudes being less than the magnitudes of the voltage excursions which may be present at said supply terminal;

first base drive means for supplying a substantially constant voltage to the base electrode of said pass transistor;

diode means connected between said source of the reference voltage and the first additional electrode of said pass transistor for limiting voltage excursions of the first polarity to less than the first predetermined magnitude;

a bipolar transistor of a second conductivity type having a base electrode and first and second additional electrodes;

first connecting means connecting the first electrodes of said bipolar transistors of first and second conductivity types;

second connecting means connecting said supply terminal to the second terminal of said transistor of the second conductivity type; and second base drive means for supplying a substantially constant current to the base of said transistor of the second conductivity type.

25. An integrated circuit voltage regulator with improved transient protection, comprising:

an input terminal for receiving electrical current at a voltage which may have substantial superimposed excursions of first or second polarities relative to a reference voltage;

a source of the reference voltage;

an output terminal for supplying electrical current at a regulated voltage;

first and second bipolar transistors of opposite conductivity types, each having a base electrode and first and second additional electrodes;

first connecting means connecting corresponding first additional electrodes of said first and second transistors to said output and input terminals respectively and providing a connection between the corresponding second additional electrodes of said first and second transistors;

a diode connected between said source of the reference voltage and the second additional electrode of said first transistor for limiting voltage excursions of the first polarity at the second additional electrode of said first transistor to less than the electrical breakdown voltage thereof; and first and second drive means for supplying substantially constant signals to the base electrodes of said first and second transistors respectively.

26. The voltage regulator of claim 25 wherein:

the regulated voltage supplied at said output terminal is positive with respect to the reference voltage;

said first and second transistors are NPN and PNP transistors respectively, each having collector, emitter and base electrodes;

said first connecting means connects said first and second transistors so that the emitter of said first transistor is connected to said output terminal; and said diode has its cathode connected to the collector of said first transistor and its anode connected to said source of the reference voltage.

27. The voltage regulator of claim 26 wherein said first drive means includes a Zener diode having cathode and anode electrodes connected to the base of said first transistor and said source of the reference voltage respectively.

* * * * *